Nov. 5, 1940.   H. N. WALES   2,220,432
DIFFERENTIAL DRIVING MECHANISM
Filed April 9, 1940

Inventor
Harry N. Wales
By
Atty.

Patented Nov. 5, 1940

2,220,432

UNITED STATES PATENT OFFICE 2,220,432

DIFFERENTIAL DRIVING MECHANISM

Harry Norman Wales, Kew, Victoria, Australia

Application April 9, 1940, Serial No. 328,794
In Australia January 12, 1940

3 Claims. (Cl. 74—389.5)

This invention relates to differential driving mechanism suitable for embodiment in automobiles and other mobile vehicles or machines where it is desired to transmit power with differential motion to two shafts or two transport wheels.

In the specification of my United States Patent No. 2,034,318 dated March 17, 1936, I have disclosed a differential driving mechanism which may be irreversible, or may be designed for any desired degree of reversibility, and which will, when applied to automobiles, prevent single wheel spin and the resultant objections that frequently occur with conventional tooth gear differential mechanism when the tractive adhesion of one road wheel differs from that of the other road wheel.

In accordance with my said prior Patent No. 2,034,318 the drive is transmitted from an annular driving element to the shafts to be driven, by drive transmitting bars or like members, which rotate with and are reciprocable axially of the annular driving element.

Such or like members are provided with teeth that are adapted to co-operate with substantially zig-zag tracks formed around the peripheries of two collars that are secured to the respective shafts, whereby the zig-zag tracks normally prevent axial movement of the bars so that the assembly rotates as a unit until operating conditions are such as to require differential motion between the two shafts whereupon the bars are permitted to move axially during rotation and thus permit necessary relative rotation between the two shafts.

Furthermore, according to my said prior Patent No. 2,034,318 two series of the drive transmitting bars are provided, the bars of the two series being identical with the exception of their length, and they are thus referred to in the said specification as "short" and "long" bars respectively. One of the aforesaid collars has a single zig-zag track, while the other collar has two similar tracks which are opposed to each other so that adjacent courses of the two tracks between the angles or apices thereof are inclined in opposite directions. The teeth at the ends of the bars of one series slidably engage the track of the first collar and one of the tracks of the second collar, while the teeth at the ends of the bars of the other series slidably engage the track of the first mentioned collar and the other of the tracks of the second mentioned collar.

Mechanism in accordance with my said prior patent has proved eminently satisfactory under strenuous working conditions, but as a result of further investigations I have found that it is possible to simplify the construction and to reduce the overall dimensions of the mechanism without in any way impairing its efficiency.

The primary object of the present invention is, therefore, to provide improvements in such mechanism whereby manufacturing costs will be reduced and whereby a more compact assembly of parts may be obtained.

In accordance with this invention I overcome the necessity of providing one of the collars with two tracks, and I also dispense with the necessity of providing two series of the drive transmitting bars. On the contrary I now calculate that it is possible to obtain equal operating efficiency by providing each of the collars with only one zig-zag track and by providing that all of the drive transmitting bars are identical in all respects.

In order to more clearly explain the invention and how it may be carried into actual practice, reference will now be made to the accompanying drawing which illustrates, by way of example, one practical embodiment.

Referring to the drawing which forms part of this specification:

Figure 1:
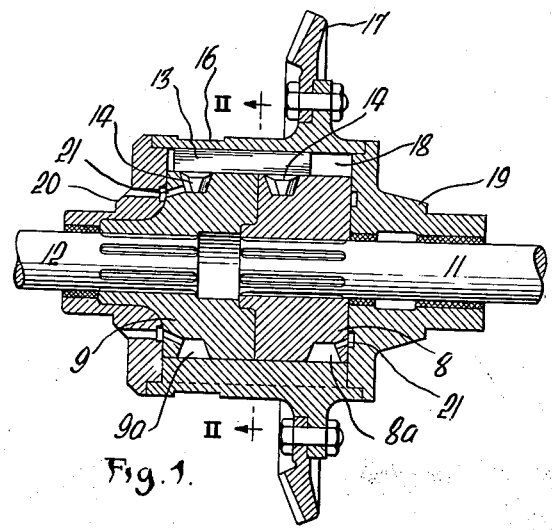
Figure 1 is a longitudinal section of a differential driving mechanism in accordance with the invention.
Figure 2:
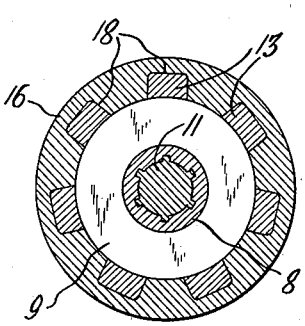
Figure 2 is a cross section taken on the line II—II of Figure 1.
Figure 3:
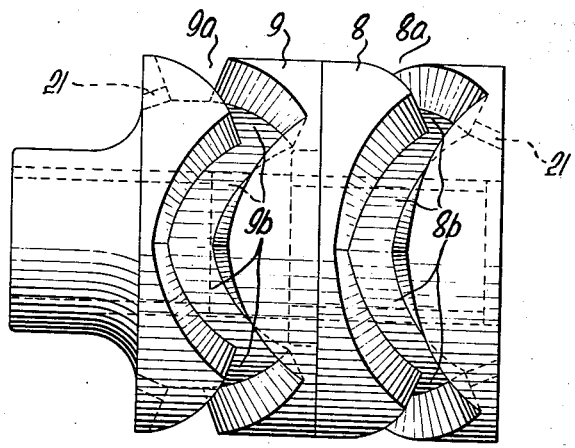
Figure 3 is an enlarged elevation of the two single-grooved collars seen in Figure 1.
Figure 4:
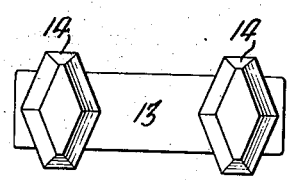
Figures 4, 5 and 6 are respectively plan, end and perspective views of a drive transmitting member.
Figure 5:
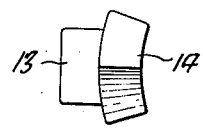

In accordance with this invention each of the two collars 8, 9, which are splined or otherwise made fast to the respective axles 11, 12, is provided around its periphery with a single, endless, substantially zig-zag track 8a, 9a, preferably in the form of a groove as shown. Each complete track must have an even number of courses and the number of courses of the track of one collar must exceed by at least two, the number of courses of the track of the other collar. By way of example, the track 8a of collar 8, is shown as having six courses 8b, while the track 9a of collar 9, is shown as having eight courses 9b. The angle or inclination of the courses of one track differ from the angle or inclination of the courses of the other track in proportion to the numerical difference of the courses in each track.

The number of the drive transmitting members 13 that are employed will be intermediate the numbers of the courses of the tracks in the two collars; thus if there are six courses for one track and eight courses for the other track as aforesaid, then seven of the drive transmitting bars or slippers will be employed.

Figure 7:
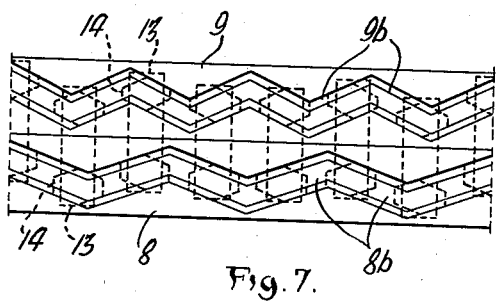
Figure 7 is a diagram or developed view of the peripheries of the two single-grooved collars and showing possible positions of the drive transmitting members in relation to the grooves.
Figure 6:
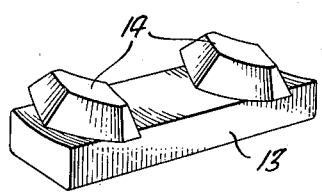

These drive transmitting bars will all be identical with each other and are provided at their ends with substantially diamond-shape teeth or like members 14, adapted to slidably engage the respective tracks 8a, 9a, as indicated in the upper part of Figure 1 and in Figure 7.

The remaining parts of the assemblage may be substantially as disclosed in my aforesaid Patent No. 2,034,318. Thus the annular driving element may consist of a cylindrical housing 16 fitted with a crown wheel 17 and provided with axially extending slideways 18 for the drive transmitting bars 13. The housing 16 may be closed at its ends by caps 19, 20. Holes 21, may extend from the outer end faces of the collars 8, 9, into the track grooves for the passage of lubricant.

The operation of the improved mechanism is substantially as described in my said prior patent. Thus when a vehicle embodying the mechanism is travelling along a straight path, the assembly will rotate as a unit, the drive being transmitted to the collars 8, 9, by the bars 13 which under such conditions cannot move axially, as the respective teeth 14 of the bars are engaged in oppositely inclined courses of the respective pair of grooves. When the vehicle is cornering or deviates from a straight path, the resultant speeding up of one road wheel and the slowing down of the other road wheel permits the teeth of the drive transmitting bars to slide along their respective grooves and the bars themselves to reciprocate axially within their slideways 18 in the housing 16 so that the desired compensation in the speed of the road wheels is obtained.

It will be apparent that by eliminating one of the zig-zag tracks and by making it possible to employ drive transmitting bars that are identical in all respects, manufacturing costs will be considerably reduced. Furthermore, the elimination of one of the zig-zag tracks enables the longitudinal or axial dimension of the assembly to be materially reduced so that a smaller or more compact assemblage is obtained which is particularly advantageous from a practical point of view when applying the mechanism to automobiles.

Having now described my invention what I claim as new and desire to secure by Letters Patent is:

1. Improvements in differential driving mechanism of the character wherein the drive is transmitted from an annular driving element to shafts to be driven by drive transmitting members which rotate with, and are reciprocal axially of, said driving element and are adapted to slidably engage in endless, substantially zig-zag tracks formed around the peripheries of two collars that are secured respectively to said shafts; characterised in that each collar has a single, endless, substantially zig-zag track, the number of courses composing the track of one collar exceeding by at least two the number of courses composing the track of the other collar while the angle of the courses of one track differ from the angle of the courses of the other track in proportion to the numerical differences between the courses of the two tracks.

2. Improvements in differential driving mechanism as claimed in claim 1, and further characterized in that the number of the drive transmitting members employed is intermediate the numbers of the courses composing the said tracks.

3. Improved differential driving mechanism, comprising an annular driving element, a series of identical drive transmitting members mounted at circumferentially spaced intervals within said driving element so as to rotate therewith while being capable of relative movement in a substantially axial direction, two collars fast upon the adjacent ends of shafts to be driven at differential speeds, each collar having around its periphery, a single, endless, substantially zig-zag track, the number of courses composing the track in one collar exceeding by at least two the number of courses composing the track of the other collar while the angle of the courses of one track differ from the angle of the courses of the other track in proportion to the numerical difference between the courses of the two tracks, each of said drive transmitting members being provided with two portions adapted to slidably engage the respective tracks.

HARRY NORMAN WALES.